Figure 1:
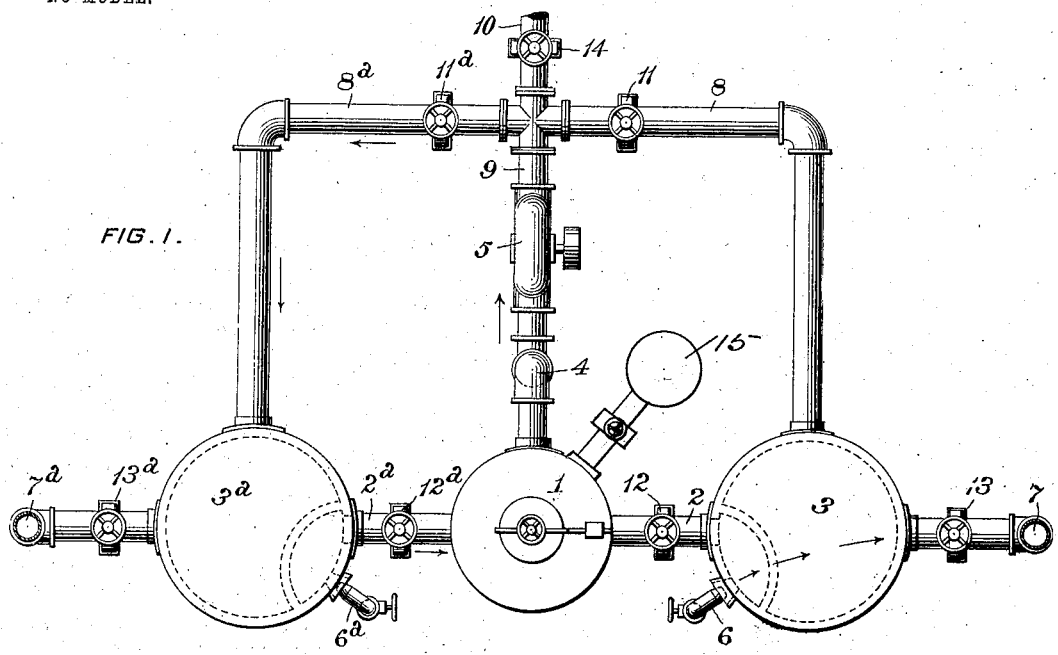

No. 768,230. PATENTED AUG. 23, 1904.
W. J. KNOX.
MANUFACTURE OF CARBONIC ACID GAS.
APPLICATION FILED JUNE 30, 1898.

NO MODEL.

WITNESSES:
W. G. Doolittle
Ethel Gallagher

INVENTOR,
William J. Knox,
by T. J. Hogan,
Att'y.

No. 768,230.

Patented August 23, 1904.

UNITED STATES PATENT OFFICE.

WILLIAM J. KNOX, OF PITTSBURG, PENNSYLVANIA, ASSIGNOR TO GEO. WESTINGHOUSE, OF PITTSBURG, PENNSYLVANIA.

MANUFACTURE OF CARBONIC-ACID GAS.

SPECIFICATION forming part of Letters Patent No. 768,230, dated August 23, 1904.

Application filed June 30, 1898. Serial No. 684,783. (No specimens.)

*To all whom it may concern:*

Be it known that I, WILLIAM J. KNOX, a citizen of the United States, residing at Pittsburg, in the county of Allegheny and State of Pennsylvania, have invented or discovered a certain new and useful Improvement in the Manufacture of Carbonic-Acid Gas, of which improvement the following is a specification.

The object of my invention is to provide a process for effecting calcination and the manufacture of gas of a high degree of purity; and to this end my invention consists in a new and improved process for calcining limestone, cement, rock, or other similar material and manufacturing gas by supplying heat to the interior of the calcining vessel, kiln, or furnace by means of a fluid heat-carrier which is introduced into the interior in a heated state and which consists of the gases of dissociation, whereby sufficient heat at a practicable temperature is supplied without the generation or introduction of impurities such as are produced in the combustion of ordinary fuels.

My improved process is specially adapted for the manufacture of lime, cement, and plaster-of-paris and for the manufacture of carbonic-acid gas of great purity.

In the practice of my invention the material to be calcined, such as limestone, is contained in a vessel or kiln from which air is excluded and to which the heat necessary for calcination is supplied by the introduction into the vessel or kiln of a heated gas, such as carbonic-acid gas, where limestone is being calcined. The gas obtained by the heating of the material in the kiln in the process of calcination, is passed through a stove or heater and then returned to the kiln, where it is passed through the mass of material to be calcined and parts with its heat by contact and radiation. Since all of the heat is supplied by the heated carbonic-acid gas, the employment of ordinary fuel as heretofore practiced is dispensed with, the solid products of the calcination are not vitiated by the admixture of ash from fuel, and the gaseous products are not diluted and vitiated by atmospheric nitrogen, sulfur compounds, and other products of the combustion of fuel. In the case of carbonates the resulting carbonic acid will be in a high state of purity and can be used in soda manufacture, for refrigerating purposes, for aerated waters, and for other purposes for which pure carbonic acid is desirable.

My invention is not limited to the employment of any particular apparatus for carrying out the process, and any suitable apparatus may be employed comprising a kiln or kilns or other calcining vessel or vessels, suitable hot-blast stoves, or pipes, fans or other necessary appliances for withdrawing the gases and passing a portion of them through the stoves in which they absorb sufficient heat to carry on the reaction when introduced into the interior of the calcining vessel.

Figure 2:
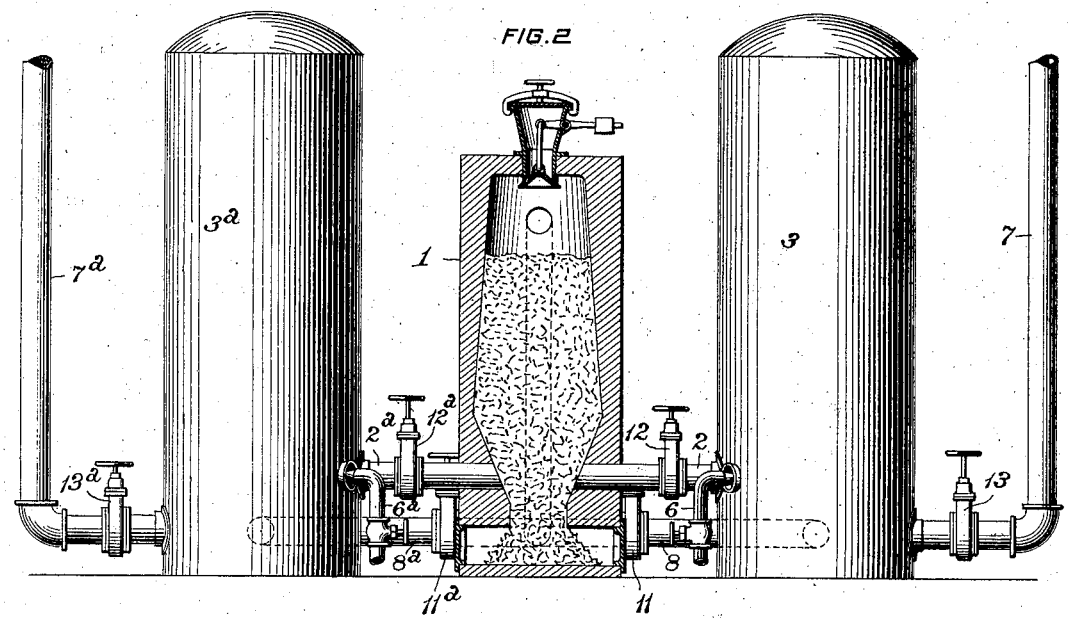

In the accompanying drawings, which illustrate an apparatus for carrying out my process, Figure 1 is a plan, and Fig. 2 is an elevation, partly in section, of an apparatus for carrying out my invention.

The calcining vessel or kiln 1 is connected by pipes or passages 2 and $2^a$ with the stoves or superheaters 3 and $3^a$, respectively, and by a pipe 4 with a fan or blower 5. A combustible gas may be supplied to the superheaters through the pipes 6 and $6^a$ for heating the superheaters, and the products of combustion pass off through the pipes or flues 7 and $7^a$. 13 and $13^a$ represent valves for controlling these pipes or flues. Pipes 8 and $8^a$ connect the outlet 9 from the blower with the cooler portions of the superheaters 3 and $3^a$, respectively, and a pipe 10 forms a communication from the outlet of the blower to a scrubber or holder.

In the ordinary operation the blower 5 will draw gas from the top of the kiln 1 through the pipe 4 and discharge it through the outlet 9 into the pipe 10 and into one of the pipes 8 or $8^a$, one of the pipes 8 or $8^a$ being cut off by means of a valve 11 or $11^a$. When the valve $11^a$ is closed, that portion of the gas which does not pass off through the pipe 10 will pass through the pipe 8 into the superheater 3, where it will be heated, and from the superheater 3 it will pass through the pipe 2 into the lower portion of the kiln or calcining vessel 1, the valve 12 being open and the valve $12^a$ being closed. From the lower portion of the vessel 1 the hot gas passes up through the mass of material which is to be calcined and from which the gas is to be generated. The hot gas parts with its heat by contact with the material to be calcined and by radiation, and thereby effects the calcination of the material and the generation of gas, which is drawn off through the pipe 4. While the superheater 3 is connected with the calcining vessel the superheater $3^a$ is cut off therefrom and from communication with the blower and is being heated by the combustion of gas supplied through the pipe $6^a$, the products of combustion passing off through the pipe $7^a$. When the superheater $3^a$ is sufficiently heated, the superheater 3 is cooled down to a certain degree, and the calcining vessel is then shut off from the superheater 3 and connected with $3^a$, the valves 11 and 12 being closed and the valves $11^a$ and $12^a$ being opened. The gas from the top of the kiln then passes from the fan through the pipe $8^a$ into the superheater $3^a$ and through the pipe $2^a$ into the lower portion of the kiln, where it acts, as before, to effect the calcination and generation of gas as it parts with its heat in passing upward through the material to be calcined.

The valve 14 in the pipe 10 is so adjusted as to permit the discharge of so much of the gas as may not be necessary to act as a carrier for the necessary heat from the superheater to the interior of the calcining vessel. The gas required as a carrier for the heat will ordinarily be a constant quantity, and the gas passing off through the pipe 10 in a given time will be equal to the quantity generated in that time.

With the apparatus shown in the drawings the process may be started by first heating one of the superheaters to the necessary degree, then connecting the kiln with that superheater while it is cut off from the other, and starting the blower. The rate of dissociation depends upon the tension of the vapor or gas of dissociation at any given temperature. The rate of dissociation in practice depends upon the rapidity of removal of the dissociated gas from the calcining vessel, and the rate of dissociation may be increased by the addition of some such foreign gas or vapor as steam to the circulating gaseous heat-carrier. In the drawings I have illustrated a suitable source 15 of steam for this purpose. The foreign gas or vapor preferably should be readily removable—as, for example, steam which may be separated by condensation; but a gas may be employed which it is desired to incorporate with the evolved gas to render it suitable for some subsequent application.

I claim as my invention and desire to secure by Letters Patent—

The hereinbefore-described process of manufacturing carbonic-acid gas, which consists in heating carbonic-acid gas, passing the heated gas through carbonates or carbonic-acid-gas-containing substances thereby imparting heat thereto and thus generating additional carbonic-acid gas, withdrawing a portion of the carbonic-acid gas approximately equivalent to that thus generated, reheating the remainder thereof, passing the reheated remainder continuously through the carbonates or carbonic-acid-gas-containing substances, and increasing the rate of dissociation by the addition of steam to the circulating gaseous heat-carrier, substantially as described.

In testimony whereof I have hereunto set my hand.

WILLIAM J. KNOX.

Witnesses:
   EDWARD B. VAILL,
   W. G. DOOLITTLE.